May 8, 1956 D. G. FAUST ET AL 2,744,534
AIRLINE FILTER AND AUTOMATIC DRAIN VALVE
Filed Aug. 22, 1952
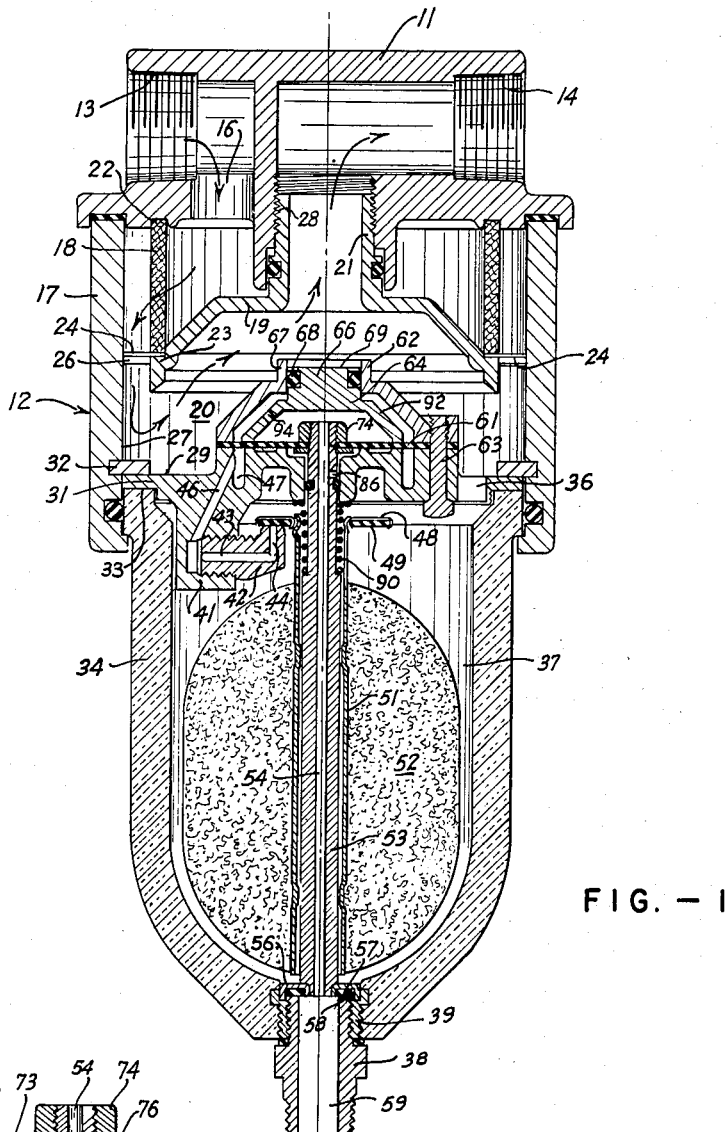
FIG.—1
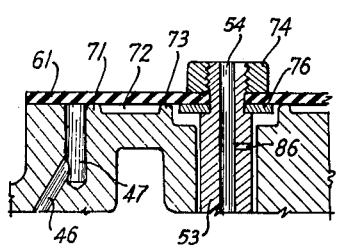
FIG.—2
INVENTORS
Delbert G. Faust &
BY Jesse A. Wilson, Jr.
ATTORNEY

United States Patent Office 2,744,534
Patented May 8, 1956

2,744,534

AIRLINE FILTER AND AUTOMATIC DRAIN VALVE

Delbert G. Faust and Jesse A. Wilson, Jr., Englewood, Colo., assignors to C. A. Norgren Co., a corporation of Colorado Application August 22, 1952, Serial No. 305,836

5 Claims. (Cl. 137—195)

The present invention relates to an air line filter and automatic drain device for compressed gas conduits, and more particularly to a filter having incorporated therewith a float-operated automatic drain valve adapted to remove entrained foreign matter from a moving stream of gaseous fluid.

Included among the objects and advantages of the present invention is a device for removing foreign matter from a stream of gas under pressure passing through a conduit to various points of use. One important function of the device is the removal of entrained liquid from the stream of gas as it passes through the conduit. The device is especially valuable for removing entrained water and other liquids from compressed air lines, and to automatically discharge accumulated liquids from the compressed air system with a minimum loss of air. The device provides means for removing entrained liquid from the gas stream and provides a storage reservoir for retaining the separated liquid. The device also provides a float-operated drain valve which quickly and efficiently discharges the collected liquid only when a sufficient amount of liquid has been accumulated.

Another object of the present invention is to provide a device which removes solid foreign matter from the gas stream as well as entrained liquid.

A further object is to provide a float member in the storage reservoir, movement of which will actuate a control valve thereby admitting gas under pressure into the valve mechanism to facilitate opening of the drain valve and the consequent discharge of the liquid collected therein.

A still further object of the invention is to provide an automatic drain valve which operates effectively either under static or dynamic conditions. That is, the drain valve mechanism will discharge accumulated liquid when the system is under pressure but no gas is moving therethrough, as well as when gas is moving through the system. This function is valuable where a compressed gas system is idle over a period of time, but is retained under pressure. With the device of the invention installed in such a pressure system, accumulated condensed moisture will be discharged during the idle time, whereby the system is always ready for immediate use.

Further objects and advantages of the present invention will be apparent from the appended description and drawing, in which Figure 1 is a cross-sectional elevation taken along the center line of a device made in accordance with the present invention; and Figure 2 is an enlargement of the valve actuating mechanism of Figure 1.

Briefly stated, the present invention provides a mechanism for mechanically separating foreign matter from a flowing gas or air stream by means of the combined use of a filter element for initially separating solid foreign matter from the gas stream and a vortex creating means for segregating liquid foreign matter from the gas stream before it is again allowed to pass out of the device and into a connected conduit. Besides providing for the separation of liquids and solids from the gas stream, the present invention provides a seperate storage chamber in which the liquid is collected. A float-actuated drain valve positioned in this storage chamber provides means for utilizing the pressure of the gas stream to operate a valve member which controls elimination of the collected liquid.

The device, generally shown by reference numeral 12 in Figure 1, comprises a main body 11, and a detachable cylindrical filter body 17. The body 11 has an inlet 13 and an outlet 14 adapted for connection into a conduit used to carry a stream of gas under pressure along a desired path. Gas entering the inlet is deflected downwardly through an intersecting passage 16 into the filter body. A passage 28 intersects the outlet 14 and provides means of egress of air from the device. A bell-shaped baffle 19 having a hollow boss 21 is connected to the passage 28. A filter element 18 is secured between a shoulder 23 of the baffle and a groove 22 in the body 11. The filter element 18 is preferably made of sintered metal; however, other filter mediums are satisfactory. A flow-directing plate 24 is secured between the filter element and the shoulder of the baffle, and by means of the integral vanes 26 directs air in a circular path downwardly into the vortex chamber 20. The air in the vortex chamber 20 reverses and exhausts through passage 28 and subsequently through the oulet 14. Entrained liquid in the gas will be thrown out against the wall of the vortex chamber, and the cleaned air exhausts as aforementioned. The separated liquid flows into a reservoir 34 secured to the bottom of the filter body, through a plurality of openings 36 in the bottom of the vortex chamber. A valve housing 31 secured between the reservoir 34 and a retaining ring 32 in the filter body nominally forms the vortex chamber bottom. A resilient diaphragm 61 closes the top of the valve housing 31 and is held in place by a housing cap 67. The housing cap 67 is retained in position on the housing body by means of a plurality of bolts 63 disposed around the periphery thereof. One end of an elongated valve stem 53 is secured by a nut 74 to the diaphragm 61, and the opposite end thereof forms the drain valve of the device. The drain valve comprises a backing plate 56 and a valve face 57. The valve face 57 closes against a seat 58 in the bottom of the reservoir. The seat 58 is formed on the inner end of an outlet adapter 38 which has a passage 59 therethrough. The adapter 38 is connected to an insert 39 molded into the wall of the reservoir 34.

A floating cap or piston 66 is disposed within the housing cap 67. The cap rides within a hollow boss 67 of the housing cap 62. The floating cap is sealed by means of an O ring seal 68 between the floating cap and the housing cap. A passage 54 is provided through the stem 53 so that the chamber underneath the floating head is substantially at atmospheric pressure at all times. A small bleed hole 94 is provided in the piston skirt 92 to prevent pressure build up in the space between the piston skirt and the housing cap. The pressure differential across the piston holds it tightly against the diaphragm in normal position. The piston skirt 92 is flared so that it rests on the diaphragm directly above raised seat 71. The force of the piston against the diaphragm effectively seals the groove 47.

A float 52 having a tubular insert 51 is telescopically engaged with the stem 53. The insert 51 is substantially larger than the stem 53 so that the float is freely reciprocable on the stem. A valve 49 backed by a backing plate 48 is disposed on the upper end of the tube 51. The valve housing 31 has an extension 41 extending into the reservoir 34, and an insert 42 is disposed at the bottom end thereof. A series of passages 44, 43 and 46 lead from the extension to an annular groove 47 in the body of the valve housing lying beneath the diaphragm 61. The valve 49 is adapted to close the passage 44 when the float is in non-floating position. The valve 49 is made circular to permit free rotation of the float and still close the offset valve seat at the end of passage 44. An annular groove 72 in the valve housing body provides a volume substantially smaller than the volume provided by groove 47. The two volumes are normally defined by the diaphragm 61 seating against raised seats 71 and 73.

In operation, air enters the inlet 13 through the passage 16 into the filter chamber where solid foreign matter is separated and retained away from the valve mechanism. Air passes through the filter element 18 down through the directional baffle plate 24 and into the vortex chamber 20. The entrained liquid is thrown out of the air against the wall 27 of the vortex chamber, and the cleaned air passes up through passage 28 and subsequently through the outlet 14. The separated liquid flows from the vortex chamber into the reservoir 37 through a plurality of holes 36. When a sufficient quantity of liquid has been accumulated, the float rises lifting valve 49 and opening the passage 44 permitting compressed air to enter the groove 47. As the pressure builds up in groove 47 the diaphragm 61 is distended slightly upwardly allowing air to enter the groove 72. The combined area of the diaphragm under groove 47 and 72 is sufficiently larger than the area of the top 69 of the floating cap 66 so that the diaphragm is abruptly distended upwardly when both areas are subject to the pressure in groove 47. The diaphragm distends upwardly moving the valve stem along with it opening the valve 57 and discharging liquid from the reservoir. The air pressure in the reservoir helps discharge liquid through the drain valve 57 as the outlet is substantially at atmospheric pressure and the reservoir is substantially line pressure. As the liquid level drops, the float drops to its normal position closing passage 44. A small orifice 86 permits the air under the diaphragm to discharge to the atmosphere through the drain, and when the upward force resulting from the pressure under the diaphragm falls below the opposing downward force exerted by pressure on the floating cap, the diaphragm is moved back to normal position, closing the drain valve. The orifice 86 maintains the chamber underneath the diaphragm substantially at atmospheric pressure except when the valve 49 is open admitting air into the grooves. The orifice is substantially smaller than passage 44, 43 and 46 so that an accumulation of pressure can build up underneath the diaphragm, opening it. A light spring 90 at the top of the float 52 aids in the downward movement of the valve 57 to supply quick action, to prevent excessive loss of air escaping through the drain valve, and further, to insure positive closing of the valve during low pressure operation.

The groove 47 is proportioned to provide an adequate storage volume for compressed air which is retained until the pressure in groove 47 acting over the area of the diaphragm 61 exposed between seating surface 71 and the clamping surface between body 31 and cap 67, is sufficient to overcome the force of the pressure acting on surface 69, at which instant, the diaphragm is extended upwardly, unseating from surface 71. The air under pressure stored in groove 47 is immediately permitted to expand, distributing itself across an increased portion of the area of diaphragm 61 represented between seating surface 73 and the outer clamping surfaces between body 31 and cap 67. The volume of annular groove 72 is maintained at a minimum so that the compressed gas expanding from annular groove 47 across the increased diaphragm area will have a minimum of volume to occupy and will, therefore, fill this enlarged volume with a minimum drop in pressure. This pressure acting on the enlarged diaphragm area, represented between seating surface 73 and the clamping surfaces between body 31 and cap 67, provides a force acting in an upwardly direction significantly larger than the downwardly acting force resulting from the pressure acting on piston surface 69; therefore, the immediate result is a snap-action instantaneous opening of valve 57. Further, the floating cap 66 utilizes the pressure of the system to close the valve, and permits satisfactory operation over a wide range of operating pressures.

Others may readily adapt the invention for use under various conditions of service, by employing one or more of the novel features disclosed or equivalents thereof. As at present advised with respect to the apparent scope of our invention, we desire to claim the following subject matter.

What is claimed is:

1. In a diaphragm-operated drain valve including a housing enclosing a diaphragm and an interconnected drain valve the improvement which comprises, a reciprocable piston in said housing adapted to rest on the upper surface of said diaphragm, the upper surface of said piston subject to actuating air pressure and the lower surface thereof subject to a reduced pressure whereby to hold the diaphragm in normal undistended position, a plurality of spaced-apart grooves lying on the opposite side of said diaphragm in said housing, and passage means adapted to permit compressed air to flow into one of said grooves and there remain until the pressure thereof slightly distends said diaphragm exposing the other said grooves whereby a large area of said diaphragm is exposed to said air pressure and the force of the air distends said diaphragm upwardly displacing said piston and whereby said distention actuates said drain valve.

2. A diaphragm-operated drain valve for a pressurized container including a float to supply activating air to a diaphragm housing enclosing a diaphragm and including an interconnected valve, the improvement which comprises, a groove of predetermined volume beneath said diaphragm and associated with a relatively small area thereof, means including a piston subject to container pressure for normally holding said diaphragm in undistended position, a portion of the upper surface of said diaphragm being associated with a pressure less than container pressure, and means associated with said float for admitting a metered rate of flow of air under pressure into said groove, said groove adapted to accumulate air under pressure to provide a force against said small area greater than the force exerted downwardly by said means holding said diaphragm whereby said diaphragm is slightly distended exposing a major area of said diaphragm, the volume of said groove being sufficient to provide from contained air under pressure a force against said major area which is greater than the said force exerted downwardly whereby said diaphragm is distended upwardly opening said drain valve.

3. A diaphragm-operated drain valve for a pressurized container including a float to supply activating air to a diaphragm housing enclosing a diaphragm and including an interconnected valve, the improvement which comprises, a groove of substantial volume beneath said diaphragm and associated with a relatively small area thereof, means including a piston and a flared skirt subject to container pressure for normally holding said diaphragm in undistended position, said flared skirt resting in annular contact on the upper surface of said diaphragm in a position to normally maintain said diaphragm in association with said groove, a portion of the upper surface of said diaphragm being associated with a pressure less than container pressure, and means associated with said float for admitting a metered rate of flow of air under pressure into said groove, said groove adapted to accumulate air under pressure to provide a force against said small area greater than the force exerted downwardly by said means holding said diaphragm whereby said diaphragm is slightly distended exposing a major area of said diaphragm, the volume of said groove being sufficient to provide from contained air under pressure a force against said major area which is greater than the said force exerted downwardly whereby said diaphragm is distended upwardly opening said drain valve.

4. A diaphragm-operated drain valve adapted to be enclosed in a pressurized gas container, comprising a diaphragm housing, a diaphragm dividing the interior of said housing into upper and lower compartments, means connecting said diaphragm with said drain valve, means for confining a predetermined volume of gas in a groove beneath said diaphragm in said lower compartment in contact with a minor annular portion of said diaphragm, means inclusive of a float-operated valve for introducing metered pressurized gas from said container into said groove, means inclusive of a piston seated on said diaphragm in an annular area of contact centrally of said diaphragm for normally holding said diaphragm in undistorted position, said piston having an upper face subject to said pressurized gas in said container and a lower face subject to reduced pressure, means for maintaining a reduced pressure on said lower face, and means for releasing pressurized gas from said lower compartment at a rate less than the entering pressurized gas whereby when said float valve is open gas enters said groove to build up a volume of gas of sufficient pressure to initially raise said diaphragm exposing a major area and provide a sufficient force on said diaphragm to suddenly distend said diaphragm operating said valve, said releasing means adapted to release gas from said lower compartment permitting said diaphragm to return to undistended position in the absence of a flow of incoming pressurized gas.

5. In a diaphragm-operated drain valve having a diaphragm dividing a housing into upper and lower compartments and in which activating air is introduced into one compartment to distend said diaphragm, the improvement which comprises hollow piston means resting in annular engagement on the upper surface of said diaphragm, passage means through said diaphragm interconnecting the interior of said hollow piston with a zone of reduced pressure, and an upper face on said piston subject to actuating air pressure forcing said piston against said diaphragm for normally maintaining said diaphragm in undistended position.

References Cited in the file of this patent

UNITED STATES PATENTS

| 624,511 | Littlefield | May 9, 1899 |
| 969,282 | Humberstone | Sept. 6, 1910 |
| 1,784,664 | Eickholt | Dec. 9, 1930 |
| 1,904,994 | Malone | Apr. 25, 1933 |
| 2,416,855 | St. Clair | Mar. 4, 1947 |
| 2,510,049 | Neeson | May 30, 1950 |
| 2,665,711 | Parks | Jan. 12, 1954 |

FOREIGN PATENTS

| 14,797 | Great Britain | 1914 |